United States Patent Office

3,431,175
Patented Mar. 4, 1969

3,431,175
METHOD FOR THE PREPARATION OF A LIPOPROTEIN LIPASE BY CULTIVATING ORGANISMS
Kei Arima and Gakuzo Tamura, Tokyo, Teiiti Narasaki, Kita-gun, and Yoshio Nakamura and Takashi Saiki, Tokyo, Japan, assignors to Amano Seiyaku Kabushiki Kaisha, Nagoya, Aichi Prefecture, Japan
No Drawing. Filed July 7, 1965, Ser. No. 470,206
Claims priority, application Japan, July 18, 1964, 39/40,492
U.S. Cl. 195—62        2 Claims
Int. Cl. C12k 1/10; C12d 13/10

---

ABSTRACT OF THE DISCLOSURE

"Microbial lipoprotein lipase" which is similar to but distinguishable from lipoprotein lipase obtained from animals, is produced by culturing Pseudomonas fluorescens, Pseudomonas schulkilliensis, Pseudomonas saccharophila, Pseudomonas aeruginosa, Mucor hiemalis, Mucor javanicus, Mucor mandshuricus, Mucor flavus, Mucor circinelloides, Streptomyces aureus, Streptomyces parvus, Serratia marcescens, Aeromonas hydrophila, Bacillus megatherium, Bacillus cereus or Bacillus subtilis.

---

This invention relates to a method for the preparation of a lipoprotein lipase by separating the same from a filtered broth obtained from a broth culture or a solid culture of an organism having high ability for the production of lipoprotein lipase.

The lipoprotein lipase is a special glycerolester hydrolase for hydrolyzing a triglyceride derived from a lipoproteinic substance such as chlomicron or other low density lipoprotein and, as has been reported, said lipoprotein lipase was found as a lipemia clearing factor in the blood plasma after a heparin venous injection was made. Also, it is well known that the lipoprotein lipase is detected in various animal tissues and that it plays an important part in the lipoid metabolism of animals.

However, the lipoprotein lipase has not yet been detected in higher vegetables or plants and organisms, and said lipoprotein lipase has been considered to be an enzyme found only in animals. Further, there are no improved methods for purifying the lipoprotein lipase and also its chemical properties are not yet ascertained.

Now the inventors have newly found some organisms having high ability for the accumulation of lipoprotein lipase in a broth culture or a solid culture by cultivating various kinds of organisms by taking into consideration the fact that the organisms are varied in their abilities for the production of enzyme. And further, the inventors have found that a highly purified lipoprotein lipase can be separated from broth cultures or solid cultures of some organisms having high ability for the production of lipoprotein lipase by using conventional purification methods.

Thus, this invention has accomplished an economical method for the production of lipoprotein lipase by using the action of organisms. Namely, this invention provides a method for the production of lipoprotein lipase by obtaining a filtered broth of a broth culture or a solid culture containing lipoprotein lipase resulting from the cultivation of a organism having high ability for the production of lipoprotein lipase in said culture and separating said lipoprotein lipase by applying a purification method for enzyme such as fractional precipitation, adsorption and desorption method or chromatography to said filtered broth.

It should be noted that this invention affords a great contribution to the art, e.g. in the pharmaceutical or food industries because a highly purified lipoprotein lipase can economically be manufactured in accordance with this invention.

The inventors, now, selected about 2,000 kinds of strains from molds, yeasts, actinomycetes, bacteria and etc. stored in the Tokyo University, Agricultural Chemistry Department, Fermentation Classroom and inventors' organisms separated from soil and they were cultivated in culture media containing olive oil or in a solid culture and the resulting broth culture or the filtered broth of said solid culture was tested for its lipoprotein lipase activity in accordance with the so-called "pulp disc method" using an agar plate containing an artificial lipoproteinic substance and its lipoprotein activity was analyzed in accordance with the turbidity method for separating an enzyme having high activity for the production of lipoprotein lipase. The results of the tests are given in the following Table 1.

TABLE 1

| Organism | Pulp disc method (diameter of clear zone, mm.) | Turbidity method (decrease of O.D. in 650mµ per hour) |
|---|---|---|
| Pseudomonas fluorescens | 15 | 0.50 x 40 |
| Pseudomonas schulkilliensis | 14 | 0.40 x 10 |
| Pseudomonas saccharophila | 12 | 0.50 x 5 |
| Pseudomonas aeruginosa | 14 | 0.45 x 40 |
| Mucor hiemalis | 13 | 0.45 x 10 |
| Mucor javanicus | 15 | 0.55 x 40 |
| Mucor mandshuricus | 14 | 0.45 x 10 |
| Mucor flavus | 16 | 0.50 x 20 |
| Mucor circinelloides | 13 | 0.50 x 10 |
| Streptomyces aureus | 15 | 0.54 x 5 |
| Streptomyces parvus | 15 | 0.30 x 10 |
| Serratia marcescens | 13 | 0.45 x 20 |
| Aeromonas hydrophila | 13 | 0.30 |
| Bacillus megatherium | 15 | 0.40 |
| Bacillus cereus | 14 | 0.20 |
| Bacillus subtilis | 12 | 0.15 |

It was found that the enzymes produced by the above mentioned organisms did not act on an olive emulsion but acted on an olive oil activated with a blood serum or a blood plasma and containing an artificial lipoproteinic substance. And also, it was found that the properties of such enzymes were in agreement with the property of a lipoprotein lipase produced from the animals because those enzymes' hydrolyzing actions were impeded by a high concentration sodium chloride solution and a low concentration sodium taurocholate solution. Now the properties of the lipoprotein lipase produced by using the organisms in accordance with this invention are compared with those of a lipoprotein lipase produced from a chicken adipose tissue, Candida cylindracea and a pancreatic lipase of cow, and the results of the tests are given in the following Table 2. It should be noted that the numerals given in Table 2 indicate the activities of the enzymes as shown by decrease of O.D. in 650 mµ per hour.

TABLE 2

| Substrate | Addition | Lipoprotein lipase | | | | Lipase | |
|---|---|---|---|---|---|---|---|
| | | Pseudomonas aeruginosa | Mucor javanicus | Streptomyces parvus | Chicken Adipose Tissue | Candida cylindracea | Cow Pancreas |
| 0.06% Olive oil emulsion | | 0.00 | 0.00 | 0.02 | 0.00 | 1.80 | 0.20 |
| 0.06% olive oil emulsion activated by blood serum. | 30% blood serum | 3.70 | 4.30 | 2.50 | 2.40 | 0.02 | 2.00 |
| | 30% blood serum plus 1 mol NaCl | 1.60 | 2.00 | 1.40 | 0.10 | 0.02 | 2.50 |
| | 30% blood serum plus 0.05 mol sodium taurocholate. | 0.00 | 0.00 | 0.04 | 0.00 | 0.02 | 4.50 |

The enzyme produced in accordance with this invention is a new lipoprotein lipase distinguishable from the well known lipase but similar to the lipoprotein lipase obtained from animals. Such new lipoprotein lipase is given the name of "microbial lipoprotein lipase" (referred to as microbial LPL hereinafter).

The organisms used in accordance with this invention are cultivated by using the conventional culture medium and the conventional cultivating processes and microbial LPL contained in a broth culture or a filtered broth of a solid culture can be fractionally precipitated by using salts and solvents. When ammonium sulfate is used as the salt, it is preferable to collect the part dissolved with a 20% saturated $(NH_4)_2SO_4$ solution and the part precipitated with a 50% saturate $(NH_4)_2SO_4$ solution. When acetone is used as the solvent, it is preferable to collect the part precipitated with a 50% saturated acetone solution.

When the microbial LPL is fractionally precipitated, the resulting precipitate is purified by a dialysis method using a dialysis membrane such as a cellophane, bladder membrane or a collodion membrane thereby to eliminate the salt and the solvent. If desired, the water decontaminated with an ion exchange resin may be used as the circulation water for dialysis.

The dialyzed microbial LPL solution is mixed with a buffer solution (pH is 4.5) in the same volume and containing a 0.8 mol sodium chloride and a 0.2 mol acetic acid and then the mixture is passed through a tower packed with diethylaminoethyl cellulose (referred to as DEAE-C hereinafter), which is treated with a buffer solution (pH is 4.5) containing a 0.4 mol sodium chloride and a 0.1 mol acetic acid, to eliminate the major part of the impure proteinic substance by adsorption. In another case, said microbial LPL solution is mixed with the DEAE-C with agitation and the mixture is filtered to eliminate the major part of the impure proteinic substance. After this treatment was completed, the activity of the resulting enzyme is increased to ten times the original activity.

The microbial LPL solution purified with the DEAE-C is subjected to fractional precipitation by using a salt or a solvent to recover the lipoprotein lipase and the resulting lipase is dialyzed and then purified with chromatography to produce a purified microbial LPL. The chromatography uses the DEAE-C treated with a buffer solution (pH is 4.5) containing a 0.01 mol acetic acid and then the enzyme adsorbed in the DEAE-C is dissolved out from said DEAE-C by using a buffer solution (pH is 4.5) containing a 0.4 mol sodium chloride and a 0.02 mol acetic acid.

The purified microbial LPL thus obtained is an acidic sugar protein showing a strong anthrone reaction and the maximum absorptivity in 280 m$\mu$ and unstable at pH below 3.0 but stable at pH within the range of from 4.0 to 6.0 and considerably stable even at pH above 9.0. The optimum pH is about 7.0 and the optimum temperature is about 50° C.

This invention is illustrated by the following examples but it should be understood that this invention is not limited thereto or thereby.

EXAMPLE 1

A culture medium containing *Pseudomonas aeruginosa*, 1% of corn steep liquor, 0.6% of urea, 0.5% of glucose and 1% of soybean oil and having pH of 6.0 was allowed to stand for 4 days at 26° C. with agitation by bubbling air while the pH of said medium was controlled to 5.0 and then a diatomaceous earth (which is named as Radiolite Special Flow sold by Showa Kagaku Kogyo) was added as a filter aid for filtration and the mixture was subjected to filtration. The filtrate is mixed with ammonium sulfate to produce the precipitate saturated with said ammonium sulfate ranging from 30 to 60%. The total lipoprotein lipase was recovered with the yield of 80%. About 200 grams of the precipitate were recovered from 10 liters of the broth culture. This precipitate was dissolved by using 2 liters of a solution containing a 0.01 mol ammonium hydroxide and the resulting solution was mixed with Hyflo Super Cel which is made by Johns-Manville Company and then the mixture was filtered. The filtrate was mixed with a 0.1 mol sulfuric acid to control its pH to 3.4 and then allowed to stand for one hour at 0° C. to produce the precipitate. The resulting precipitate was collected by using centrifugal force and then dissolved with 500 milliliters of a solution containing 0.02 mol of ammonium hydroxide and the resulting solution was subjected to dialysis for 2 days at a temperature of 0 to 3° C. by using cellophane membrane and water decontaminated with an ion exchange membrane. The dialyzed enzyme solution was mixed with sodium chloride and acetic acid to a concentration of 0.4 mol sodium chloride and 0.2 mol acetic acid and its pH was controlled to 4.5 and then 150 grams of DEAE-C were added to the mixture with agitation intermittently and it was allowed to stand for 4 hours at a temperature of 0 to 2° C. and then finally the mixture was filtered. The filtrate thus obtained was mixed with ammonium sulfate to reach 60% saturation and then allowed to stand overnight at a temperature of 0 to 2° C. to produce a precipitate and then the resulting precipitate was collected by using centrifugal force. The precipitate was dissolved in 50 milliliters of a solution containing a 0.01 mol ammonium hydroxide and the resulting solution was dialyzed for 4 days by using water decontaminated with an ion exchange material and further dialyzed for one day by using a buffer solution (pH is 4.5) containing a 0.01 mol acetic acid. The dialyzed enzyme solution thus produced was passed through a tower provided with 80 grams of DEAE-C treated with a buffer solution (pH is 4.5) containing a 0.01 mol acetic acid and then said enzyme was dissolved out from the solution by continuously increasing the concentration of sodium chloride up to a 0.4 mol concentration. The microbial lipoprotein lipase can be extracted as a single peak in the theoretical amount. Then, the lipoprotein lipase was precipitated by adding acetone in the same volume and the precipitate was collected by using centrifugal force and then dissolved into 40 milliliters of water decontaminated with an ion exchange substance and the solution thus obtained was dialyzed and dried by using a freezing method. Thus, the purified microbial LPL weighed about 2 grams.

EXAMPLE 2

*Pseudomonas fluorescens* was cultivated in a culture medium containing 0.3% of meat extract, 1.5% of polypeptone, 0.6% of urea, 1.0% of glucose, 0.2% of $KH_2PO_4$, 0.05% of $MgSO_4 \cdot 7H_2O$, 0.05% of KCl and 1.0% of olive oil, and having pH of 6.0 by standing for 4 days at 26° C. with agitation by bubbling air while the pH of said medium was controlled to 6.0 and then a diatomaceous earth was added thereto and then the mixture was subjected to filtration. The filtrate thus produced was concentrated under vacuum to the volume of one-fifth and then acetone was added in an amount equal to the volume of the filtrate to precipitate about 70% of the total lipoprotein lipase. About 130 grams of the precipitate were recovered from 10 liters of the broth culture. This precipitate was purified in the same manner as in Example 1 and the purified microbial LPL weighed about 1.5 grams.

EXAMPLE 3

A culture medium of bran impregnated with an olive oil emulsion was used for 5 days at 26° C. for cultivating *Mucor javanicus*, and the culture was extracted with a solution containing a 0.01 mol ammonium hydroxide. The filtered broth was mixed with ammonium sulfate to the saturation of 60% to produce the precipitate of enzyme in the theoretical amount. This precipitate was purified in the same manner as in Example 1 and the purified microbial LPL weighed about 2.5 grams per 10 kgs. of the culture.

EXAMPLE 4

A culture medium containing *Mucor flavus*, 1.5% of corn steep liquor, 1% of glucose, 0.5% of a malt extract, 0.2% of $KH_2PO_4$, 0.05% of $MgSO_4 \cdot 7H_2O$, 0.05% of KCl and 1% of olive oil, and having pH of 5.0 was allowed to stand for 5 days at 26° C. with agitation and bubbling air while the pH of said medium was controlled to 7.0 and then a diatomaceous earth was added thereto and then the mixture was subjected to filtration. The filtrate thus obtained was mixed with ammonium sulfate to the saturation of 60% to produce the precipitate of enzyme. About 70 grams of precipitate were recovered from 10 liters of the broth culture. This precipitate was purified in the same manner as in Example 1 and the purified microbial LPL weighed about 3 grams.

EXAMPLE 5

A culture medium containing 0.5% of glucose, 1% of peptone, 0.2% of a meat extract, 0.1% of $KH_2PO_4$, 0.05% of $MgSO_4 \cdot 7H_2O$ and 0.5% of olive oil, and having pH of 7.0 was used for 5 days at 26° C. for cultivating *Streptomyces aureus* with agitation and bubbling air and the broth culture thus produced was purified in the same manner as in Example 1 and the purified LPL weighed about 0.5 gram per 10 liters of said broth culture.

EXAMPLE 6

*Streptomyces parvus* was cultivated in the same manner as in Example 5 and the purified enzyme was obtained in an amount of 0.7 gram.

What we claim is:

1. In a process for the production of lipoprotein lipase by cultivating a microorganism in a culture medium therefor until the lipoprotein lipase has accumulated in the culture broth, and separating and purifying the thus accumulated lipoprotein lipase, the improvement of carrying out the said cultivating step with an organism selected from the group consisting of *Pseudomonas fluorescens, Pseudomonas schulkilliensis, Pseudomonas saccharophila, Pseudomonas aeruginosa, Mucor hiemalis, Mucor javanicus, Mucor mandshuricus, Mucor flavus, Mucor circinelloides, Streptomyces aureus, Streptomyces parvus, Serratia marcescens, Aeromonas hydrophila, Bacillus megatherium, Bacillus cereus* or *Bacillus subtilis*, whereby the so-obtained lipase is microbial lipoprotein lipase is an acidic sugar protein showing a strong anthrone reaction with maximum absorptivity at 280 m$\mu$, is unstable at pH below 3.0 but is stable at pH within the range of from 4.0 to about 9.0.

2. Microbial lipoprotein lipase which is an acidic sugar protein showing a strong anthrone reaction with maximum absorptivity at 280 m$\mu$, is unstable at pH below 3.0 but is stable at pH within the range of from 4.0 to about 9.0, obtained by the process according to claim 1.

References Cited

UNITED STATES PATENTS

| | | | |
|---|---|---|---|
| 3,189,529 | 6/1965 | Yamada et al. | 195—62 |
| 3,262,863 | 7/1966 | Fukumoto et al. | 195—66 |

OTHER REFERENCES

Alford et al.: Journal of Lipid Research, July 1964, vol. 5, pp. 390–394.

LIONEL M. SHAPIRO, *Primary Examiner.*

U.S. Cl. X.R.

195—66